C. M. HAMSHAW.
SHEAR FOR ROTARY SOIL CULTIVATORS.
APPLICATION FILED MAR. 8, 1920. RENEWED JUNE 1, 1921.

1,402,858.

Patented Jan. 10, 1922.

Inventor
Clarence M. Hamshaw
Attorney
Frank Warren

UNITED STATES PATENT OFFICE.

CLARENCE M. HAMSHAW, OF CHEHALIS, WASHINGTON.

SHEAR FOR ROTARY SOIL CULTIVATORS.

1,402,858.	Specification of Letters Patent.	Patented Jan. 10, 1922.

Application filed March 8, 1920, Serial No. 364,314. Renewed June 1, 1921. Serial No. 474,294.

*To all whom it may concern:*

Be it known that I, CLARENCE M. HAMSHAW, a citizen of the United States, residing at Chehalis, in the county of Lewis and State of Washington, have invented a certain new and useful Improvement in Shears for Rotary Soil Cultivators, of which the following is a specification.

My invention relates to improvements in shears or cutting members for rotary soil cultivators of the type shown and described in my co-pending application Serial No. 265,997, filed December 9, 1918, and the object of my invention is to provide a shear of strong and simple construction that is of such shape as to form an efficient cutting member when used on a rotary soil cultivator, and to provide a strong and efficient form of bracket member that may be used for securing the shear to the drum or rotor of soil cultivator.

My invention consists in the novel construction of a shear or cutting member and in the adaptation and combination of such shear with a bracket of such form as will be more clearly hereinafter described and claimed.

I accomplish these objects by devices illustrated in the accompanying drawings, wherein—

Figure 1:
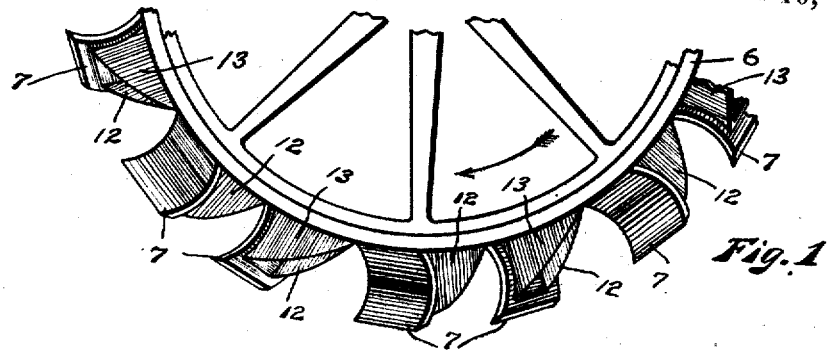
Figure 1 is a fragmentary view in side elevation of a rotary drum upon which are mounted shears or cutting members that are constructed in accordance with my invention.

Referring to the drawings, throughout which like reference numerals indicate like parts, the numeral 6 designates the shell of a rotor or drum that is mounted for rotation on a tractor frame, not shown, and is adapted to be driven in the direction indicated by the arrow.

Mounted angularly on the drum 6 are a plurality of shears or soil digging members constructed in accordance with my invention, each of such digging members comprising a shear 7 of curved cross-sectional shape that is sharpened on its outer edge and that is secured by bolts 8 to the correspondingly curved front wall 10 of a bracket which bracket is provided with a base portion 11 that is curved to conform to the curvature of the drum 6 and with side webs 12 and 13 that are integral with the front wall 10 and base portion 11 and that serve to give strength and rigidity to the bracket.

Figure 6:
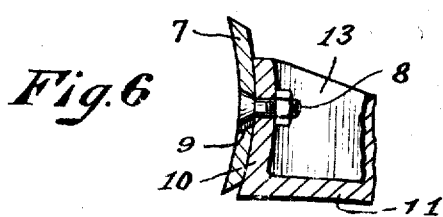
Fig. 6 is a view in cross-section on broken line 6, 6 of Fig. 2, showing a detail of my invention.

The bolts 8 are provided with lugs 9 which register with suitable slots in the shears 7 to prevent any turning movement of said bolt 8 when the shear is secured to the curved front 10 of the bracket, as shown in Fig. 6.

The base portion 11 is provided with holes 14 through which rivets or bolts may be inserted to secure the bracket to the drum 6 and if desired the central part of such base portion may be left open as at 15 to reduce the weight of the brackets.

Figure 2:
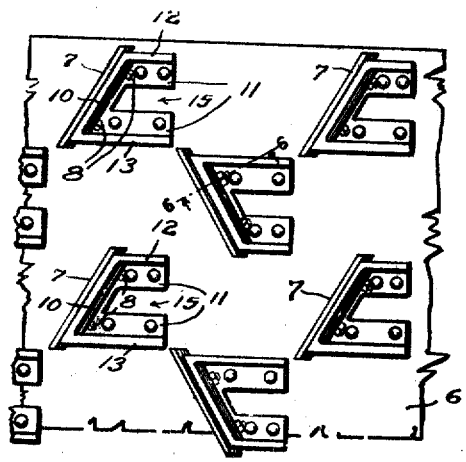
Fig. 2 is a plan view of a fragment of the drum shown in Fig. 1, as it may appear if it were flattened into a plane surface.

The front wall 10 of each bracket is inclined at other than right angles to the body of the bracket, as more clearly shown in Fig. 2, so that when the brackets are placed squarely upon the drum 6 and secured thereto the shears will be inclined or arranged at an angle with respect to any plane that passes through the axis of the drum.

The shear members are preferably arranged in rows crosswise of the periphery of the drum, the shears in each row being offset with respect to the shears in the next adjacent rows and the shears in adjacent rows being inclined in an opposite direction, as shown in Fig. 2, to avoid side draft and ridging of the ground.

By constructing the front walls 10 of the brackets at an angle to the remaining portions thereof it is possible to make a bracket that may be placed squarely upon the drum 6 and that will support the shears 7 in an inclined position of said drum.

Figure 3:
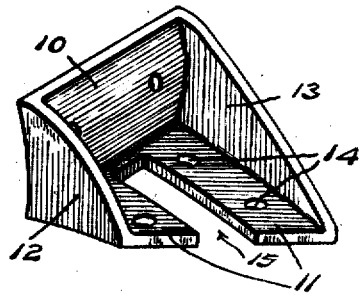
Fig. 3 is a detached view in perspective of one of the shear holding brackets.
Figure 4:
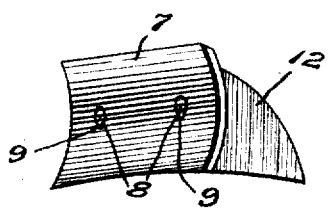
Fig. 4 is a view in side elevation of one of the shear holding brackets with the shear secured thereto.
Figure 5:
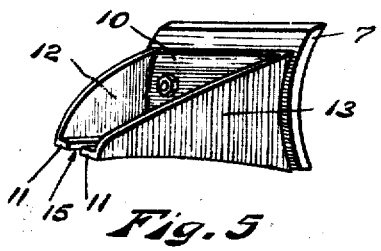
Fig. 5 is a view in side elevation showing the side of the bracket and shear opposite to that shown in Fig. 4.

In constructing these brackets it will be necessary to provide one set having their front walls inclined in one direction and another set having their front walls inclined in the opposite direction so that the shears may occupy the inclined positions on the drum 6, as shown in Fig. 3.

It will be obvious that by providing a shear of curved cross-sectional shape and by placing said shear in an inclined position upon the drum 6 that the earth will be sheared when said digging element strikes it and the curved portion of said shear will have a tendency to turn the earth over like the mould board of a plow.

It will also be obvious that the shear 7 can be used upon the opposite side of said drum when said shear becomes worn, the holes in said shear 7 being adapted to register with the holes in the bracket on the opposite side of the drum whereby the edge not worn will be exposed for shearing the earth.

Manifestly, changes may be made in the forms, dimensions and arrangement of parts of my invention without departing from the spirit thereof.

What I claim is:

1. In combination with a rotor of a soil cultivator, of a shear holding bracket having a curved cutting member angularly mounted thereon.

2. In a device of the class described, comprising a shear holding bracket provided with an angular curved wall, and a curved shear blade arranged to be secured to said front wall.

3. Shearing mechanism for the rotor of a soil cultivator comprising a shear holding bracket having a curved base arranged to fit squarely on a cylindrical drum, the rear edge of said base being at right angles to the sides thereof, an integral front wall projecting from said base in inclined relation with respect to the rear edge of said base and a shearing member arranged to be secured to said front wall.

4. Shearing mechanism of the class described comprising a bracket having a curved base and having two parallel side webs and a rear edge arranged at right angles to said webs, a curved front wall integral with said base and said side webs and inclined at other than right angles to said side webs, and a curved shearing member arranged to be removably secured to said curved front wall.

In witness whereof, I hereunto subscribe my name this 25th day of February, A. D. 1920.

CLARENCE M. HAMSHAW.